US006357266B1

(12) United States Patent
Van Buren

(10) Patent No.: US 6,357,266 B1
(45) Date of Patent: Mar. 19, 2002

(54) LATCH COVER

(76) Inventor: Randy C. Van Buren, 1338 Marilyn Dr., Syracuse, UT (US) 94076

( * ) Notice: Subject to any disclaimer, the term of this patent is extended or adjusted under 35 U.S.C. 154(b) by 0 days.

(21) Appl. No.: 09/585,687

(22) Filed: Jun. 1, 2000

(51) Int. Cl.[7] .............................................. B60R 25/02

(52) U.S. Cl. .................... 70/56; 70/54; 70/55; 70/211; 70/212

(58) Field of Search ............................... 70/56, 54, 55, 70/211, 212, DIG. 43, DIG. 56; 292/218, 259 R

(56) References Cited

U.S. PATENT DOCUMENTS 4,269,048 A 5/1981 McDorman .................... 70/13
4,380,160 A 4/1983 Hoffman ........................ 70/14
4,500,123 A * 2/1985 Harms .................... 292/259 A
4,627,248 A * 12/1986 Haworth ...................... 70/134
5,168,258 A * 12/1992 Radke ........................ 340/542
5,384,972 A 1/1995 Arnt ............................. 40/1.6
5,737,946 A 4/1998 Sole et al. ..................... 70/54
5,934,116 A * 8/1999 Moore ......................... 70/212
6,010,166 A * 1/2000 Hamilton et al. ........... 292/282

* cited by examiner

*Primary Examiner*—William A. Cuchlinski, Jr.
*Assistant Examiner*—Marthe Marc-Coleman
(74) *Attorney, Agent, or Firm*—Mallinckrodt & Mallinckrodt; Robert R. Mallinckrodt

(57) ABSTRACT

A latch cover is secured over a latch to be protected by the lock which locks the latch, and the latch cover restricts access to the latch to reduce the chance of tampering with the latch. The latch cover includes a cover plate sized to cover a substantial portion of the latch and lock when held in a position in front of the latch. Holding plates extend from the cover plate over the sides of the latch where a lock member of a lock locking the latch extend. Such lock member extends from the opposite sides of the latch and through holes in the holding plates to secure the cover in place. Side plates preferably extend between the holding plates to form a box structure to more fully cover the latch. Notches in the side plates receive items extending into or from the latch and help position the cover. The cover allows access to the lock so the lock and latch can be opened when desired and the cover removed.

8 Claims, 4 Drawing Sheets

LATCH COVER

BACKGROUND OF THE INVENTION

1. Field

The invention is in the field of latches and locks for doors and other items, particularly the large rear doors of truck trailers and cargo trucks.

2. State of the Art

There are various latching and locking systems in use today for latching and locking the rear cargo doors of truck trailers and cargo truck bodies, as well as various other doors, such as building doors, gates, or other items. In regard to truck trailers, in addition to use of such trailers with trucks for transport of freight, such trailers are often moved to semi-permanent sites for storage at such sites or for office space at such sites. Such trailers are often used at construction sites for storage and office space. In most instances, it is important to be able to securely lock a trailer or cargo area of a truck to secure the contents therein, just as it is important to be able to securely lock other items. In many instances where pad locks or pin locks are used, the lock itself is not the weak component, but the latch is the thing that can be broken or destroyed to gain access to the locked area or item.

SUMMARY OF THE INVENTION

According to the invention, a cover for a latch is secured over the latch by the same lock the locks the latch. The cover restricts access to the latch to reduce the chance of tampering with and an unauthorized opening of the latch, but allows sufficient access to the lock to allow authorized opening of the lock and latch.

The latch cover can be used with latches where the lock member of the lock which is used in conjunction with the latch to lock the latch extends from opposite sides of the latch. The latch cover includes a cover plate that covers a substantial portion of the latch and lock when in a position in front of the latch. Holding plates extend from the cover plate to cover the sides of the latch from which the lock member extends. The holding plates includes holes through which the lock member also extend to secure and hold the latch cover in place over the latch. The latch cover also preferably includes side plates which are secured to and extend between the holding plates to form a box structure around the latch when in position over the latch. The side plates preferably include notches to receive any item extending into the latch to be latched such as the door closing system handle on trailer doors or a latch hasp on other types of doors. This notch not only allows the cover to move against the surface on which the latch is mounted, but positions the latch cover and spaces it as desired from the latch which it covers.

THE DRAWINGS

Figure 1:
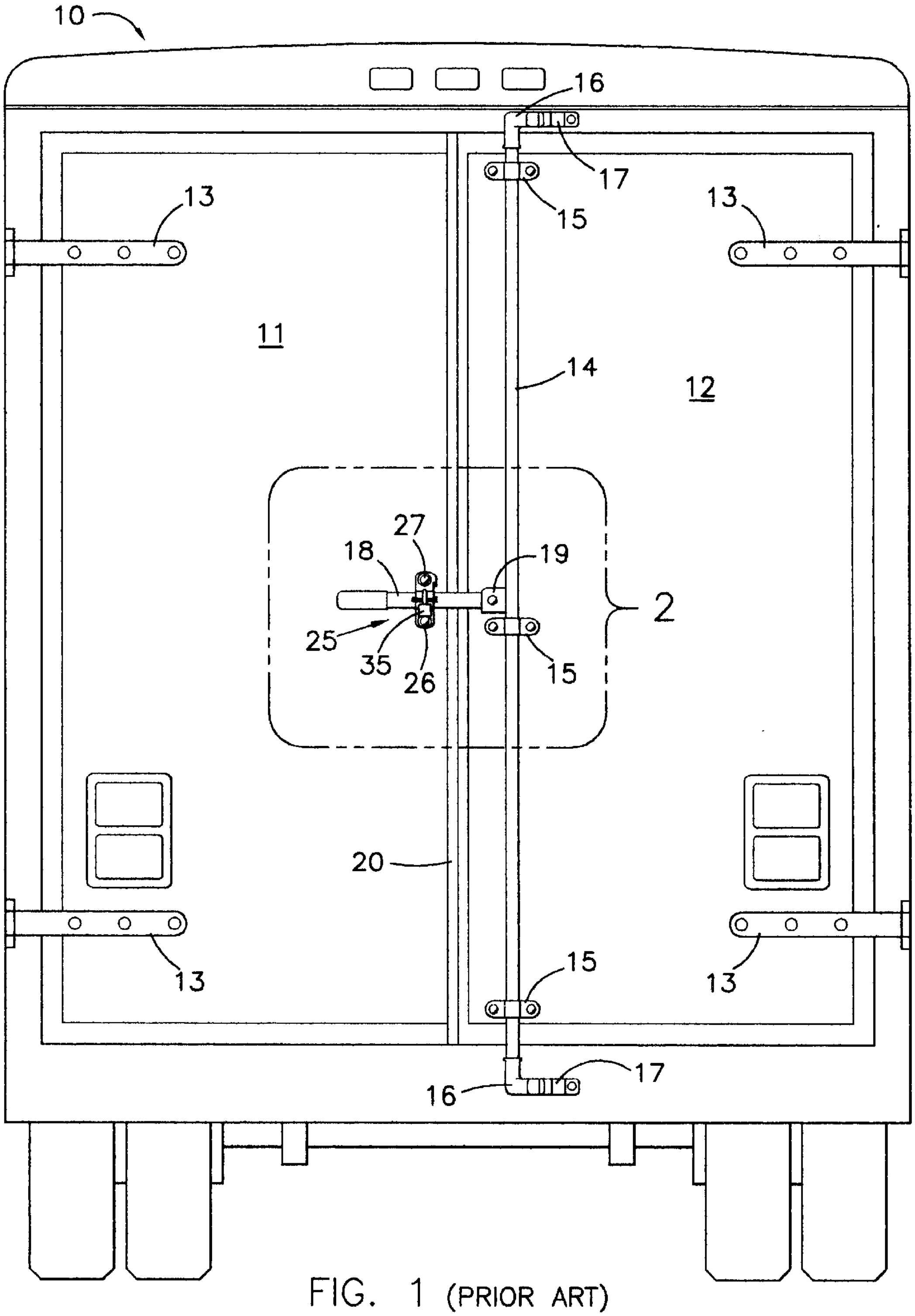
FIG. 1 (PRIOR ART)
Figure 2:
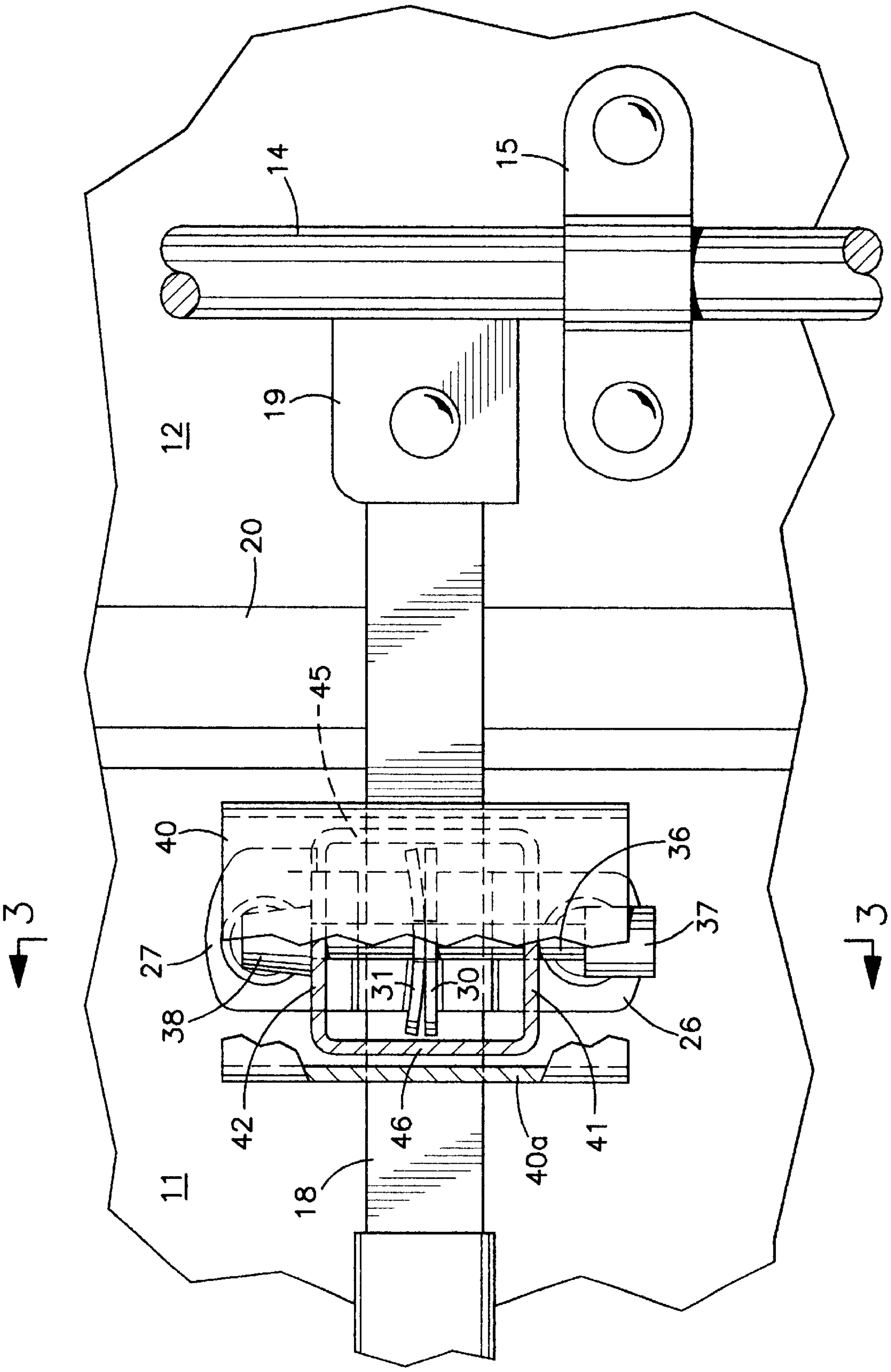
Figure 3:
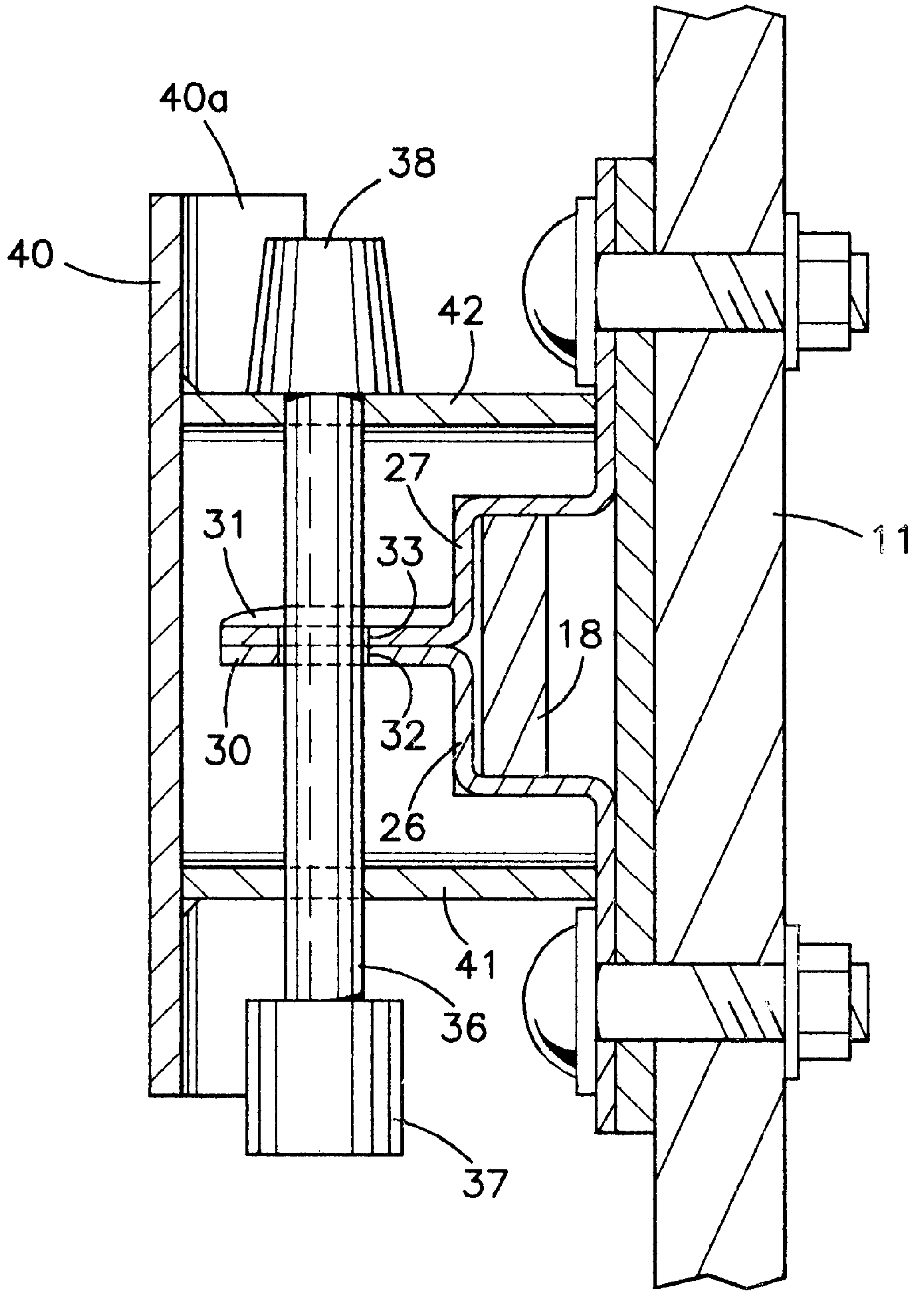

The best mode currently contemplated for carrying out the invention is illustrated in the accompany drawings, in which:

FIG. 1 is a rear elevation of a truck trailer showing the doors and locking system;

FIG. 2, an fragmentary, enlarged elevation of the portion of FIG. 1 encircled by the line 2 in FIG. 1, but showing the latch cover of the invention installed over the latch, with a portion of the latch cover broken away;

FIG. 3, a vertical section taken on the line 3–3 of FIG. 2; and

Figure 4:
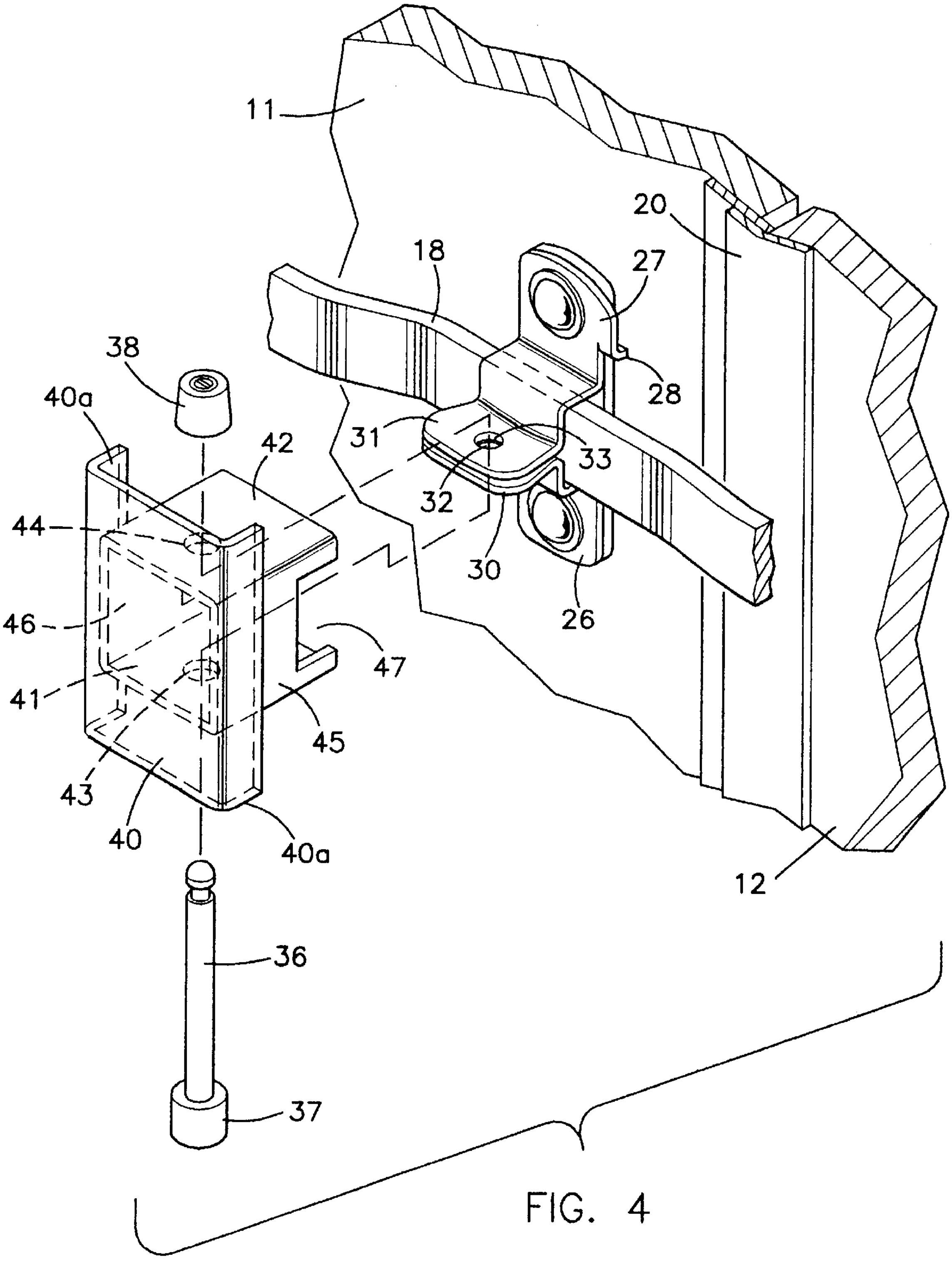

FIG. 4, an assembly view showing how the cover of the invention is installed over the latch.

DETAILED DESCRIPTION OF THE ILLUSTRATED EMBODIMENT

Truck trailers, and trucks with similar closed cargo areas, such as shown in FIG. 1, include a closing apparatus and latch for holding the doors of the closed cargo area closed. The latch generally has provision for placing a lock such as a padlock or pin lock thereon to lock the doors and discourage unauthorized entry into the cargo area. As shown in FIG. 1, the rear of a truck trailer 10 includes two cargo doors 11 and 12 hinged to the trailer 10 by hinges 13. A vertical shaft 14 is rotatably mounted on door 12 by brackets 15. Closing elements 16 are secured to opposite ends of shaft 14 and cooperate with closing brackets 17 secured to trailer 10. A handle 18 is pivotally mounted to shaft 14 by bracket 19. In operation, shaft 14 is rotated by pulling handle 18 outwardly toward the viewer in FIG. 1. This rotates closing elements 16 inwardly toward the trailer releasing the closing elements 16 from closing brackets 17 allowing door 12 to be swung open. Door edge 20 extends from door 12 to overlap the edge of door 11. With door 12 swung open enough to move edge 20 outwardly from door 11, door 11 can also be swung open. To close the doors, door 11 is swung closed and then door 12 is swung closed. When closing door 12, handle 18 is rotated outwardly and as the door closes against the trailer, handle 18 is rotated inwardly toward the trailer to rotate closing elements 16 outwardly so the ends of closing elements 16 move behind the ends of closing brackets 17 to secure the doors in closed position. Door 11 is secured in closed position by overlapping edge 20 of door 12.

In order to hold handle 18 in rotated closed position adjacent the doors as shown in FIG. 1, a latch 25 for handle 18 is provided secured to door 11. Latch 25 includes lower latching element 26 secured to door 11 and rotatable upper latching element 27 rotatably secured to door 11. As well known, latch element 27 can be rotated upwardly out of the way to allow handle 18 to be positioned in latch element 26 and then latch element 27 is rotated to the position shown in the drawings to enclose handle 18 as can be seen best in FIG. 4. As shown in FIG. 4, upper latch element 27 would be rotated in a counter clockwise direction from the position shown to allow handle 18 to be moved up and out of lower latch element 26, or similarly up and into lower latch element 26. With handle 18 in lower latch element 26, upper latch element 27 is rotated clockwise to the closed position shown. A stop 28 stops rotation in the closed position shown. Tabs 30 and 31 extending from latching elements 26 and 27, respectively, include openings 32 and 33, respectively, therethrough to receive the lock member of a lock. Various locks can be used such as a pad lock 34 as shown in FIG. 1, or a pin lock 35, as shown in FIGS. 2–4. A pin lock includes a lock member 36, with enlarged head 37, and removable lock head 38. This is all well known and currently used in the art. The lock member of the lock extends from opposite sides of the latch. Thus, as shown, lock member 36 of the pin lock passes through the openings 32 and 33 in latching elements 26 and 27 so as to extend from opposite sides of the latch.

A serious problem with the latch as described and as currently known and used is that brackets 26 and 27 are open to tampering and can be relatively easily broken or destroyed with common tools such as a crowbar or metal cutter. Regardless of the lock used, the weak points in the latch are the latching elements 26 and 27. Breaking and entering of trailers and cargo trucks is a serious problem and a large number of such trailers and cargo trucks have a latch as described.

The invention provides a cover that covers and protects latches such as the latch shown and described so far. The invention, in covering a latch, restricts access to the latch and thus makes it more difficult for a person to be able to break or destroy the latch and open the cargo doors or whatever else would be locked with such latch. The latch of the invention includes a cover plate 40 which is sized to cover at least a substantial portion of the latch and lock when positioned in front of the latch. The cover plate may be flat or, as currently preferred and as shown, have side flange that extend inwardly along two of the sides of the plate. Holding plates 41 and 42 extend from the cover plate 40 to cover the opposite sides of the latch when in position over the latch. Holding plates 41 and 42 include holes 43 and 44, respectively, through which lock member 36 passes on opposite sides of the latch to mount the cover over the latch. Preferably, side plates 45 and 46 are attached to and extend between the holding plates to form a box arrangement which surrounds the latch. This provides maximum protection for the latch. Conveniently, the holding plates and side plates can be formed from a short length of steel box beam attached, such as by welding, to the cover plate, which may also be steel. The side plates will preferably be notched as at 47 to receive the handle 18 therein. This notching provides a tighter fit for the cover over the latch and against the door and also positions and holds the cover in position over the latch so it does not slide around and fall against the top of the latch. It can be seen from FIGS. 2 and 3 that with the embodiment shown, the latch is completely covered and the most vulnerable part of the lock, the lock member, is partially covered. The cover plate makes access to the lock member much more difficult. It has been found that the cover of the invention substantially reduces or eliminates unauthorized access to trailers and cargo trucks having latches with which it can be used.

In use, the latch is latched, the cover is placed over the latch, and the lock member of the lock is passed through the holes in the holding plates and the openings or opening in the latch, depending on the type of latch used, and the lock is locked. This secures the latch and secures the cover over the latch. The cover over the latch restricts access to the latch and lock, while leaving necessary access to the lock to unlock the lock when desired.

The latch cover of the invention can be used with any type of latch which has a lock member extending from opposite sides of the latch a distance sufficient to also pass through the holding plates of the cover. Thus, for example, the cover can be used with a loop and hasp type of latch with the hasp fitting into the notch of the side plates or with the cover covering the entire latch. While the latch cover is ideally suited for use with a latch and pin lock, pad locks or other locks can also be used if the lock member of such lock extends far enough to pass through the holding plates.

Whereas this invention is here illustrated and described with reference to an embodiment thereof presently contemplated as the best mode of carrying out the invention in actual practice, it should be understood that various changes may be made in adapting the invention to different embodiments without departing from the broader inventive concepts disclosed herein and comprehended by the claims that follow.

What is claimed is:

1. A latch cover for use with a latch having a lock with a lock member which passes through at least one receiving opening in the latch when the latch is closed and projects from opposite sides of the latch, comprising:

a cover plate sized to cover a substantial portion of the latch and lock with which it is to be used when held in a position in front of the latch and lock;

holding plates extending from the cover plate to cover the opposite sides of the latch from which the lock member projects, said holding plates including holes therein positioned to receive therethrough the lock member extending from opposite sides of the latch;

whereby, when the latch cover is positioned over the latch with the lock member extending from opposite sides thereof and passing through the holes, the latch cover is held in position over the latch and lock to reduce accessability thereto, but to allow sufficient access to the lock to allow unlocking of the lock and opening of the latch.

2. A latch cover according to claim 1, additionally including side plates attached to and extending between sides of the holding plates so the holding plates and side plates together form a box extending from the cover plate to cover sides of the latch.

3. A latch according to claim 2, wherein the holding plates and the side plates are formed by a length of box beam secured to and extending from the cover plate.

4. A latch according to claim 3, wherein the latch is used to hold an elongate member in place, and the side plates are notched to accept the elongate member.

5. A latch cover according to claim 4, wherein the cover plate additionally includes side flanges along a pair of opposite sides of the plate.

6. A latch according to claim 2, wherein the latch is used to hold an elongate member in place, and the side plates are notched to accept the elongate member.

7. A latch cover according to claim 6, wherein the cover plate additionally includes side flanges along a pair of opposite sides of the plate.

8. A latch cover according to claim 1, wherein the cover plate additionally includes side flanges along a pair of opposite sides of the plate.

* * * * *